US00RE47068E

(19) United States
(12) Reissued Patent
Tajima

(10) Patent Number: US RE47,068 E
(45) Date of Reissued Patent: Oct. 2, 2018

(54) MICROSTRIP ANTENNA AND RADAR MODULE

(71) Applicant: MITSUBISHI ELECTRIC CORPORATION, Chiyoda-ku, Tokyo (JP)

(72) Inventor: Minoru Tajima, Tokyo (JP)

(73) Assignee: MITSUBISHI ELECTRIC CORPORATION, Chiyoda-Ku, Tokyo (JP)

(21) Appl. No.: 15/286,123

(22) Filed: Oct. 5, 2016

Related U.S. Patent Documents

Reissue of:
(64) Patent No.: 8,907,848
Issued: Dec. 9, 2014
Appl. No.: 13/517,439
PCT Filed: Feb. 1, 2011
PCT No.: PCT/JP2011/051988
§ 371 (c)(1),
(2) Date: Jun. 20, 2012
PCT Pub. No.: WO2011/096381
PCT Pub. Date: Aug. 11, 2011

(30) Foreign Application Priority Data

Feb. 5, 2010 (JP) ..... 2010-024366

(51) Int. Cl.

| | |
|---|---|
| ***H01Q 1/24*** | (2006.01) |
| ***G01S 7/03*** | (2006.01) |
| ***H01Q 21/06*** | (2006.01) |
| ***H01Q 21/00*** | (2006.01) |
| ***H01Q 1/48*** | (2006.01) |
| ***H01Q 9/04*** | (2006.01) |

(Continued)

(52) U.S. Cl.
CPC ..... *G01S 7/032* (2013.01); *H01Q 1/38* (2013.01); *H01Q 1/48* (2013.01); *H01Q 9/045* (2013.01); *H01Q 9/0407* (2013.01); *H01Q 21/0006* (2013.01); *H01Q 21/065* (2013.01); *G01S 2007/027* (2013.01)

(58) Field of Classification Search
USPC ..... 343/700 MS, 829, 846
See application file for complete search history.

(56) References Cited

U.S. PATENT DOCUMENTS 5,043,738 A 8/1991 Shapiro et al.
5,245,745 A * 9/1993 Jensen et al. ..... 29/600

(Continued)

FOREIGN PATENT DOCUMENTS

JP 7-46033 A 2/1995
JP 8-167812 A 6/1996

(Continued)

OTHER PUBLICATIONS

G.H. Huff; Improvements in the Performence of Microstrip Antennas on Finite Ground Planes Through Ground Plane Edge Serrations; Aug. 2002; IEEE; vol. 12, No. 1; pp. 308-310.*

(Continued)

*Primary Examiner* — Angela M Lie
(74) *Attorney, Agent, or Firm* — Buchanan Ingersoll & Rooney PC

(57) ABSTRACT

In a microstrip antenna in which a ground conductor is provided to be opposed to patch conductors, wedge shapes angled to intersect with an antenna polarization plane are provided at edges of the ground conductor in a repeated manner.

14 Claims, 4 Drawing Sheets

(51) Int. Cl.
*H01Q 1/38* (2006.01)
*G01S 7/02* (2006.01)

(56) References Cited

U.S. PATENT DOCUMENTS

| | | | | |
|---|---|---|---|---|
| 5,414,434 | A * | 5/1995 | Conant et al. | 343/700 MS |
| 7,046,196 | B1 * | 5/2006 | Langley et al. | 343/700 MS |
| 7,538,729 | B2 * | 5/2009 | Lin et al. | 343/700 MS |
| 7,605,762 | B2 * | 10/2009 | Hsu et al. | 343/700 MS |
| 8,081,122 | B2 * | 12/2011 | Kearney et al. | 343/700 MS |
| 2004/0041732 | A1 | 3/2004 | Aikawa et al. | |
| 2009/0153433 | A1 * | 6/2009 | Nagai | H01Q 1/38 343/893 |

FOREIGN PATENT DOCUMENTS

| | | | |
|---|---|---|---|
| JP | 11-284429 | A | 10/1999 |
| JP | 2004-112394 | A | 4/2004 |
| JP | 2005-094440 | A | 4/2005 |
| JP | 2006-148688 | A | 6/2006 |
| JP | 2007-124201 | A | 5/2007 |

OTHER PUBLICATIONS

The Extended European Search Report dated Nov. 12, 2013, by the European Patent Office in corresponding European Patent Application No. 11739729.9-1812. (9 pages).

International Search Report (PCT/ISA/210) dated Apr. 5, 2011, by the Japanese Patent Office as the International Searching Authority for International Application No. PCT/JP2011/051988.

Written Opinion (PCT/ISA/237) dated Apr. 5, 2011, by the Japanese Patent Office as the International Searching Authority for International Application No. PCT/JP2011/051988.

Huff et al., "Improvements in the Performance of Microstrip Antennas on Finite Ground Planes Through Ground Plane Edge Serrations" IEEE Microwave and Wireless Components Letters, (Aug. 1, 2002), vol. 12 No. 8, pp. 308-310.

* cited by examiner

MICROSTRIP ANTENNA AND RADAR MODULE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD

The present invention relates to a microstrip antenna and a radar module, and more particularly to a microstrip antenna and a radar module capable of reducing diffracted waves generated at edges of a ground conductor.

BACKGROUND

A microstrip antenna is one of antennas used in in-vehicle millimeter-wave radars. The microstrip antenna can be manufactured by a process of etching a conductor film on an insulating substrate, and therefore downsizing and cost reduction thereof can be achieved.

Generally, antennas used in in-vehicle millimeter-wave radars have a smaller vertical-plane beam width to only focus on target objects on the road, while having a larger horizontal-plane beam width so as to provide a wide detection range.

As the horizontal-plane beam width increases, the antenna is likely to be affected by diffracted waves generated at edges of a ground conductor. When the diffracted waves interfere with an original received wave, a phase difference periodically varies with different horizontal angles of the beam. This variation causes ripples in an antenna gain and a phase radiation pattern, which degrades detection performances of the radar, such as angle measurement accuracy.

As a method for solving these problems, there has been a method of reducing diffracted waves by applying or attaching a radio wave absorber on edges of an antenna substrate.

In addition, Patent Literature 1 discloses a technique in which a passive element is provided on edges of an antenna substrate in a microstrip antenna, and the passive element has an electrical width of one-half of a wavelength of transmitted or received electromagnetic waves, so that diffracted waves generated from a radiation element side and diffracted waves radiated from an antenna substrate edge-side portion cancel out their phases with each other.

CITATION LIST

Patent Literature

Patent Literature 1: Japanese Patent Application Laid-open No. H11-284429

SUMMARY

Technical Problem

However, the above method of applying or attaching a radio wave absorber on edges of an antenna substrate not only requires preparation of extra materials, but also causes an increase in the number of processes, leading to a problem of cost increase.

The method disclosed in Patent Literature 1 also has problems in that a receiving antenna is designed for only a single channel, and its frequency band is limited because the width of the passive element is one-half of the wavelength.

The present invention has been achieved to solve the above problems, and an object of the present invention is to provide a microstrip antenna and a radar module capable of reducing diffracted waves generated at edges of a ground conductor, while suppressing cost increase.

Solution to Problem

There is provided a microstrip antenna according to an aspect of the present invention in which a ground conductor is provided to be opposed to a patch conductor, and along an edge of the ground conductor, a shape with a tapered tip end is provided in a repeated manner.

Advantageous Effects of Invention

According to the present invention, diffracted waves generated at edges of a ground conductor are reduced, while suppressing cost increase.

DESCRIPTION OF EMBODIMENTS

Exemplary embodiments of a microstrip antenna and a radar module according to the present invention will be explained below in detail with reference to the accompanying drawings. The present invention is not limited to the embodiments.

First Embodiment

Figure 1:
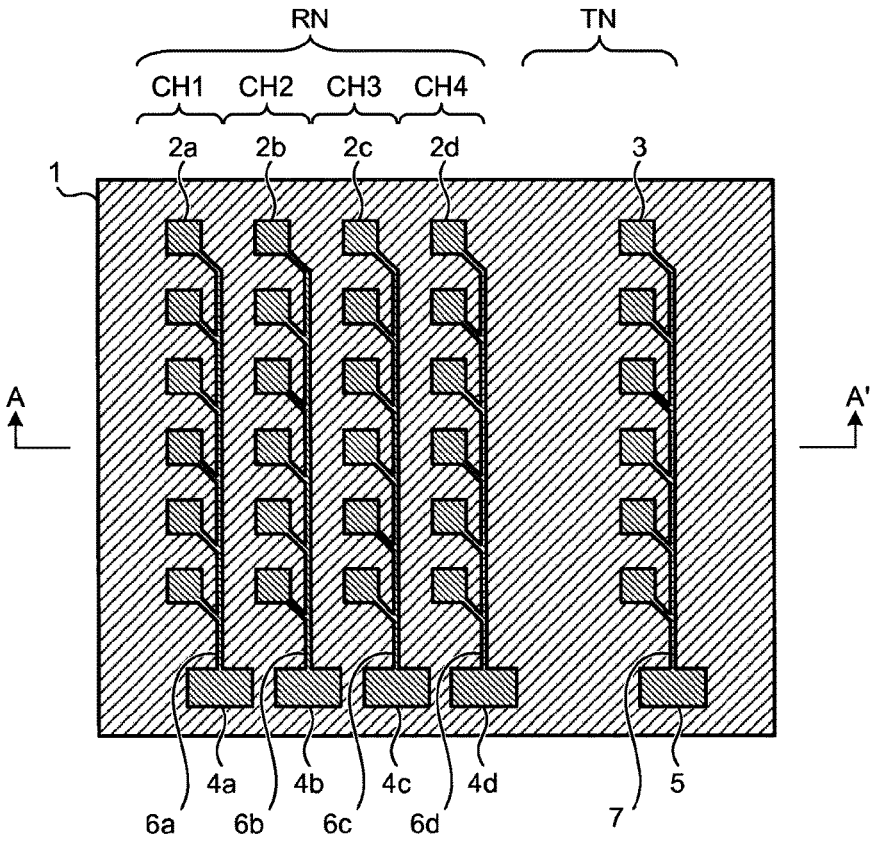
FIG. 1 is a plan view of a schematic configuration of a radar module according to a first embodiment of the present invention.
Figure 2:
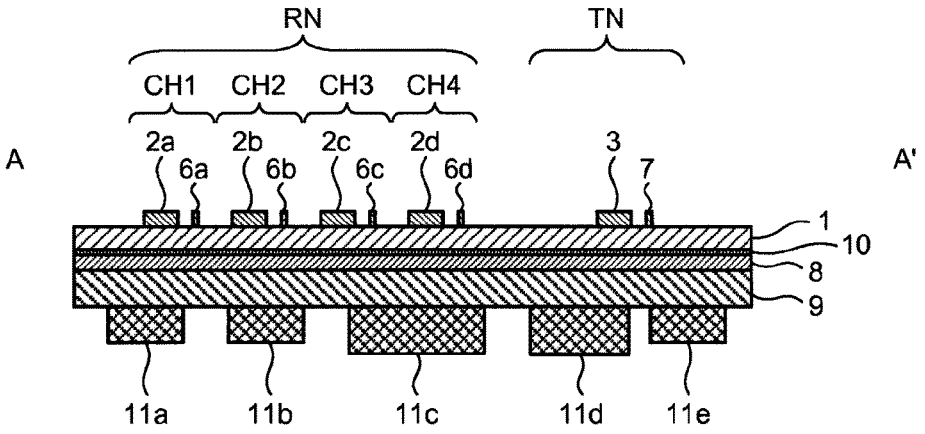
FIG. 2 is a cross-sectional view taken along a line A-A' in FIG. 1.
Figure 3:
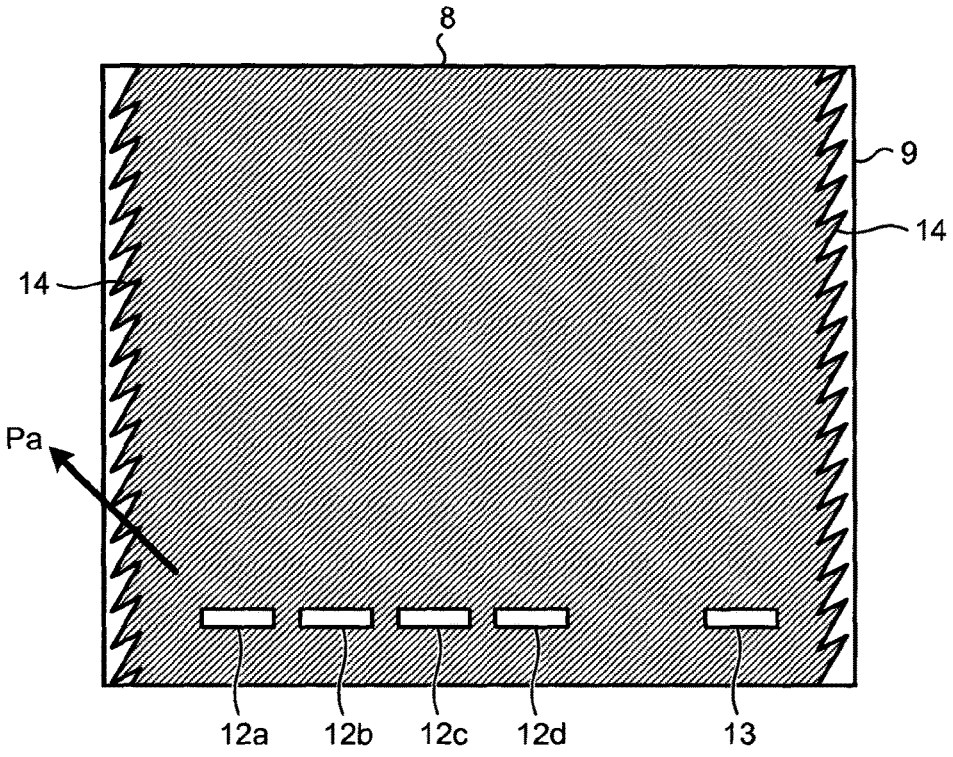
FIG. 3 is a plan view of a schematic configuration of a ground conductor used in the radar module according to the first embodiment of the present invention.

FIG. 1 is a plan view of a schematic configuration of a radar module according to a first embodiment of the present invention. FIG. 2 is a cross-sectional view taken along a line A-A' in FIG. 1. FIG. 3 is a plan view of a schematic configuration of a ground conductor used in the radar module according to the first embodiment of the present invention.

In FIGS. 1 to 3, patch conductors 2a to 2d and 3 are formed on an antenna substrate 1, while a ground conductor 8 is provided on a back surface of the antenna substrate 1 to be opposed to the patch conductors 2a to 2d and 3, thereby constituting a microstrip antenna.

In this case, the patch conductors 2a to 2d and 3 are respectively arranged in a certain direction with a predetermined space therebetween. The patch conductors 2a to 2d are connected respectively to feeding terminals 4a to 4d through feeding lines 6a to 6d, thereby constituting a receiving antenna RN for four channels CH1 to CH4. The patch conductor 3 is connected to a feeding terminal 5 through a feeding line 7, thereby constituting a transmitting antenna TN.

The ground conductor 8 is formed over the entire back surface of the antenna substrate 1. On the ground conductor 8, wedge shapes 14, each having a tapered tip end, are provided along edges of the ground conductor 8 in a repeated manner. In a case where an antenna polarization plane Pa forms an angle of 45 degrees, preferably the wedge shapes 14 are angled to intersect with the antenna polarization plane Pa. More preferably, the wedge shapes 14 are angled to intersect with the antenna polarization plane Pa at a right angle.

Coupling slots 12a to 12d and 13 are formed on the ground conductor 8. The coupling slots 12a to 12d and 13 are located to correspond to the respective positions of the feeding terminals 4a to 4d and 5. The coupling slots 12a to 12d and 13 and the wedge shapes 14 are formed by patterning the ground conductor 8. Particularly, the coupling slots 12a to 12d and 13 and the wedge shapes 14 are formed all at once during a process of etching the ground conductor 8.

As a material of the antenna substrate 1, a resin substrate of glass epoxy resin, Teflon (registered trademark) resin or the like can be used, or an insulating substrate of ceramic or the like can be used. As a material of the patch conductors 2a to 2d and 3, the feeding lines 6a to 6d, the feeding terminals 4a to 4d, and the ground conductor 8, a thin film of metal, such as Al and Cu, can be used. The patch conductors 2a to 2d and 3 can be formed into a rectangular shape, a polygonal shape, a round shape, an elliptical shape or the like.

Circuit components 11a to 11e are mounted on a circuit board 9, while a back surface of the antenna substrate 1 is bonded to the ground conductor 8 via a bonding layer 10. The circuit board 9 can be a double printed board, a multilayer printed board or a build-up board. The circuit components 11a to 11e can be an integrated circuit, such as an IC, or an electronic component, such as a transistor, a resistor, and a condenser. The circuit components 11a to 11e generate a transmission wave to be transmitted through the transmitting antenna TN and perform a receiving process for a reflected wave received through the receiving antenna RN.

The transmission wave generated on the circuit board 9 is transmitted to the feeding terminal 5 on the antenna substrate 1 through the coupling slot 13. The transmission wave transmitted to the feeding terminal 5 is then transmitted to the patch conductor 3 through the feeding line 7, so that electric power is supplied to the transmitting antenna TN to radiate the transmission wave into space.

When the transmission wave reaches a target, the receiving antenna RN receives a reflected wave from the target. When the reflected wave received by the receiving antenna RN reaches the patch conductors 2a to 2d, electric power is supplied to the feeding terminals 4a to 4d respectively through the feeding lines 6a to 6d to transmit the reflected wave to the circuit board 9 respectively through the coupling slots 12a to 12d.

A receiving process based on a signal transmitted to the circuit board 9 is performed to calculate information on an azimuth of the target, information on a relative distance to the target, information on a relative speed to the target, and the like.

In a case where a plurality of channels CH1 to CH4 are provided to the receiving antenna RN, horizontal plane scanning is performed electronically by signal processing, such as digital beamforming, thereby improving angle measurement accuracy on the horizontal plane.

Diffracted waves are generated due to electric field components parallel to an outer periphery of the ground conductor 8. The wedge shapes 14 are thus provided along the each edge of the ground conductor 8 in a repeated manner to reduce electric field components of the antenna polarization plane Pa that are parallel to the outer periphery of the ground conductor 8, thereby reducing diffracted waves generated at the edges of the ground conductor 8. As a result, it is possible to suppress interference of the diffracted waves with an original reflected wave, and thus it becomes possible to reduce ripples caused in an antenna gain and a phase radiation pattern. Therefore, detection performances of the radar, such as angle measurement accuracy, are improved even when a horizontal-plane beam width increases.

In addition, the wedge shapes 14 are formed by the process of etching the ground conductor 8. Therefore, when the wedge shapes 14 are formed all at once simultaneously with forming the coupling slots 12a to 12d and 13, an increase in the number of processes can be prevented while eliminating the need for extra materials such as a radio wave absorber, thereby suppressing cost increase.

In a case where a ground conductor is provided on the circuit board 9 itself, by forming the ground conductor on the circuit board 9 into the same shape as the ground conductor 8 on the antenna substrate 1 or forming the ground conductor on the circuit board 9 to a size small enough to prevent it from extending over the wedge shapes 14 of the ground conductor 8 on the antenna substrate 1, diffracted waves can be reduced.

Second Embodiment

Figure 4:
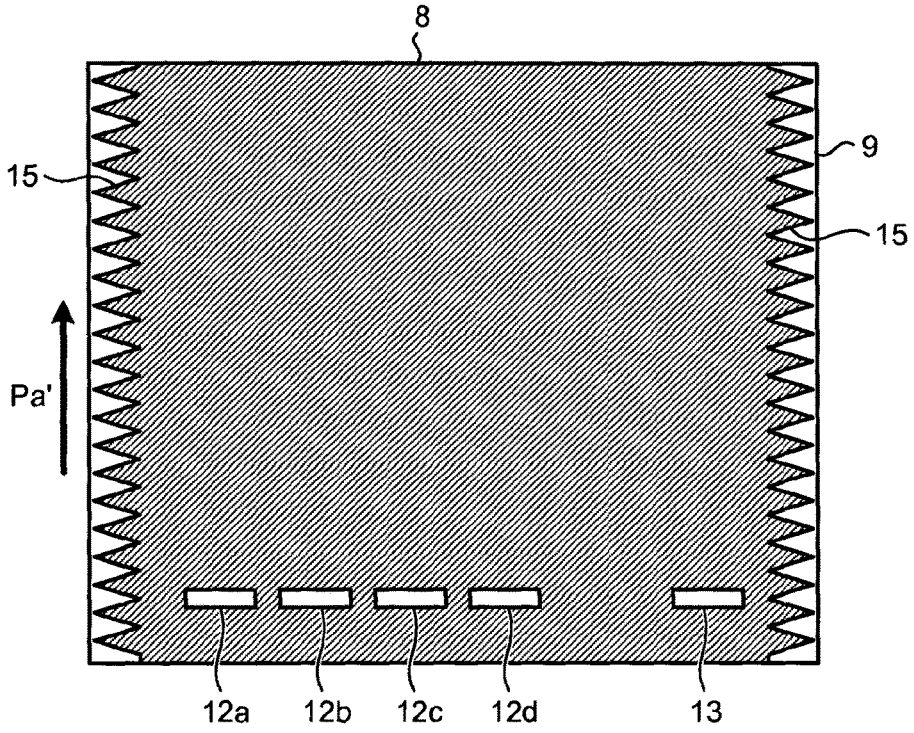
FIG. 4 is a plan view of a schematic configuration of a ground conductor used in a radar module according to a second embodiment of the present invention.

FIG. 4 is a plan view of a schematic configuration of a ground conductor used in a radar module according to a second embodiment of the present invention. In FIG. 4, in the radar module according to the second embodiment, wedge shapes 15 are provided at the edges of the ground conductor 8, in place of the wedge shapes 14 according to the first embodiment. The wedge shapes 14 according to the first embodiment are angled to intersect with the antenna polarization plane Pa of 45-degree polarization at a right angle. On the other hand, the wedge shapes 15 according to the second embodiment are formed to be located vertically with respect to the edges of the ground conductor 8 to intersect with an antenna polarization plane Pa' of vertical polarization at a right angle.

This configuration can reduce electric field components of the antenna polarization plane Pa' that are parallel to the outer periphery of the ground conductor 8, and thus reduce diffracted waves generated at the edges of the ground conductor 8, even when the vertical polarization is used in place of the 45-degree polarization.

The above embodiments have explained a method of providing the wedge shapes 14 along the edges of the ground conductor 8 in a repeated manner so as to reduce diffracted waves generated at the edges of the ground conductor 8. However, the present invention is not limited to the wedge shapes 14, but can use any shape as long as it has a tapered tip end, and can be a wave-curved shape, for example.

INDUSTRIAL APPLICABILITY

As described above, the radar module according to the present invention can reduce diffracted waves generated at edges of a ground conductor while suppressing cost increase, and thus the radar module is suitable for a means for improving detection performances of an in-vehicle millimeter-wave radar, such as angle measurement accuracy.

REFERENCE SIGNS LIST

RN RECEIVING ANTENNA
TN TRANSMITTING ANTENNA
1 ANTENNA SUBSTRATE
2a to 2d, 3 PATCH CONDUCTOR
4a to 4d, 5 FEEDING TERMINAL
6a to 6d, 7 FEEDING LINE
8 GROUND CONDUCTOR
9 CIRCUIT BOARD
10 BONDING LAYER
11a to 11e CIRCUIT COMPONENT
12a to 12d, 13 COUPLING SLOT
14 and 15 WEDGE SHAPE

The invention claimed is:

1. A microstrip antenna, comprising:
an antenna substrate;
a patch conductor formed on a first surface of the antenna substrate;
a ground conductor formed over an entire second surface of the antenna substrate and is provided to be opposed to [a] *the* patch conductor, wherein
along [an edge] *only two edges* of the ground conductor, a protruding portion is provided in a repeated manner, and
an end of the protruding portion is tapered and intersects with an antenna polarization plane.

2. The microstrip antenna according to claim 1, wherein the protruding portion is a wedge shape.

3. The microstrip antenna according to claim 2, wherein the wedge shape is angled to intersect with an antenna polarization plane.

4. The microstrip antenna according to claim 3, wherein the wedge shape is formed by patterning the ground conductor.

5. The microstrip antenna according to claim 2, wherein the wedge shape is formed by patterning the ground conductor.

6. The microstrip antenna according to claim 1, further comprising:
a circuit board located in contact with the ground conductor, and the circuit board is on an opposite side of the ground conductor than the antenna substrate.

7. A radar module comprising:
an antenna substrate;
a patch conductor formed on a first surface of the antenna substrate;
a feeding terminal formed on the first surface of the antenna substrate;
a feeding line formed on the first surface of the antenna substrate to connect the patch conductor and the feeding terminal;
a ground conductor, formed over an entire second surface of the antenna substrate, located to be opposed to the patch conductor and having a protruding portion, an end of which is tapered and which intersects with an antenna polarization plane, at an edge of the ground conductor, the protruding portion being provided in a repeated manner;
a coupling slot formed in the ground conductor and located in a position that corresponds to the feeding terminal;
a circuit board having a second surface bonded to the ground conductor via a bonding layer; and
a circuit component mounted on a first surface of the circuit board to supply electric power to the feeding terminal through the coupling slot, wherein
the circuit component is configured to generate a transmission wave to be transmitted through a transmitting antenna and perform a receiving process for a reflected wave received through a receiving antenna.

8. The radar module according to claim 7, wherein the protruding portion with a tapered tip end, which is provided at the edge of the ground conductor, is a wedge shape.

9. The radar module according to claim 8, wherein the wedge shape is formed by patterning the ground conductor.

10. The radar module according to claim 8, wherein the wedge shape is angled to intersect with an antenna polarization plane.

11. The radar module according to claim 10, wherein the wedge shape is formed by patterning the ground conductor.

*12. A radar module comprising:*
*an antenna substrate;*
*an antenna element formed on a first surface of the antenna substrate;*
*a feeding terminal formed on the first surface of the antenna substrate;*
*a feeding line formed on the first surface of the antenna substrate to connect the antenna element and the feeding terminal;*
*a ground conductor, formed over an entire second surface of the antenna substrate, located to be opposed to the antenna element and having a protruding portion, an end of which is tapered and which intersects with an antenna polarization plane, at an edge of the ground conductor, the protruding portion being provided in a repeated manner;*
*a coupling slot formed in the ground conductor and located in a position that corresponds to the feeding terminal;*
*a circuit board having a second surface bonded to the ground conductor via a bonding layer; and*
*a circuit component mounted on a first surface of the circuit board to supply electric power to the feeding terminal through the coupling slot, wherein*
*the circuit component is configured to generate a transmission wave to be transmitted through a transmitting antenna and perform a receiving process for a reflected wave received through a receiving antenna.*

*13. The radar module according to claim 12, wherein the protruding portion with a tapered tip end, which is provided at the edge of the ground conductor, is a wedge shape.*

*14. The radar module according to claim 13, wherein the wedge shape is angled to intersect with an antenna polarization plane.*

* * * * *